(12) United States Patent
Mukherjee

(10) Patent No.: US 9,565,123 B2
(45) Date of Patent: *Feb. 7, 2017

(54) METHODS AND SYSTEMS FOR SCHEDULING OFDM FRAMES

(71) Applicant: Apple Inc., Cupertino, CA (US)

(72) Inventor: Biswaroop Mukherjee, Ottawa (CA)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/875,579

(22) Filed: Oct. 5, 2015

(65) Prior Publication Data

US 2016/0028642 A1  Jan. 28, 2016

Related U.S. Application Data

(63) Continuation of application No. 14/293,693, filed on Jun. 2, 2014, now Pat. No. 9,154,434, which is a
(Continued)

(51) Int. Cl.
*H04L 12/873* (2013.01)
*H04L 5/00* (2006.01)
*H04L 12/54* (2013.01)
*H04L 12/801* (2013.01)
*H04L 12/851* (2013.01)
*H04L 12/861* (2013.01)
(Continued)

(52) U.S. Cl.
CPC .............. *H04L 47/527* (2013.01); *H04B 7/04* (2013.01); *H04L 5/001* (2013.01); *H04L 5/0007* (2013.01); *H04L 5/0023* (2013.01); *H04L 5/0044* (2013.01); *H04L 12/5693* (2013.01); *H04L 47/10* (2013.01); *H04L 47/14* (2013.01); *H04L 47/2441* (2013.01); *H04L 47/564* (2013.01); *H04L 49/90* (2013.01); *H04L 49/901* (2013.01); *H04L 49/9057* (2013.01); *H04W 72/1205* (2013.01); *H04L 25/03891* (2013.01)

(58) Field of Classification Search
None
See application file for complete search history.

(56) References Cited

U.S. PATENT DOCUMENTS 6,049,549 A    4/2000  Ganz et al.
7,272,119 B2   9/2007  Rudnick et al.
(Continued)

FOREIGN PATENT DOCUMENTS

EP      1758312 A1     2/2007
WO      WO03041300 A1  5/2003
WO      WO2005125263 A1 12/2005

OTHER PUBLICATIONS

Ayyagari et al., "Comparison of TDM and OFDMA Access Methods for Powerline OFDM Systems", Second IEEE Consumer Communications and Networking Conference, Jan. 3-6, 2005 (CCNC 2005), pp. 364 to 368.

*Primary Examiner* — Brandon Renner
(74) *Attorney, Agent, or Firm* — Downey Brand LLP

(57) ABSTRACT

System and methods for scheduling OFDM frames are provided. Each packet is assigned to a frame bucket, this amounting to a temporary decision of when to transmit the packet. Each packet is marked with one or more metrics. The metrics are used to sort packets and make scheduling decisions. Packets are analyzed to determine their suitability for MIMO transmission.

20 Claims, 8 Drawing Sheets

Related U.S. Application Data continuation of application No. 11/540,571, filed on Oct. 2, 2006, now Pat. No. 8,743,676.

(60) Provisional application No. 60/799,314, filed on May 10, 2006.

(51) Int. Cl.
*H04L 12/879* (2013.01)
*H04W 72/12* (2009.01)
*H04L 12/875* (2013.01)
*H04B 7/04* (2006.01)
*H04L 25/03* (2006.01)

(56) References Cited

U.S. PATENT DOCUMENTS

| | | |
|---|---|---|
| 2002/0041635 A1 | 4/2002 | Ma et al. |
| 2002/0105952 A1 | 8/2002 | Bonomi et al. |
| 2003/0002495 A1 | 1/2003 | Shahar et al. |
| 2003/0185174 A1 | 10/2003 | Currivan et al. |
| 2004/0004995 A1 | 1/2004 | Boesel et al. |
| 2004/0114618 A1 | 6/2004 | Tong et al. |
| 2004/0127226 A1 | 7/2004 | Dugad et al. |
| 2005/0286410 A1 | 12/2005 | Truong et al. |
| 2006/0039312 A1 | 2/2006 | Walton et al. |
| 2006/0056283 A1 | 3/2006 | Anikhindi |
| 2006/0182191 A1 | 8/2006 | Darwood et al. |
| 2006/0280116 A1 | 12/2006 | Ji et al. |
| 2007/0115800 A1 | 5/2007 | Fonseka et al. |
| 2007/0140208 A1 | 6/2007 | Varikat |
| 2007/0230326 A1 | 10/2007 | Pandoh et al. |
| 2008/0002619 A1* | 1/2008 | Tujkovic ............... H04L 5/023 370/330 |
| 2008/0076432 A1* | 3/2008 | Senarath ............... H04W 36/18 455/442 |

* cited by examiner

FIG. 4D

| | |
|---|---|
| 1 | $PD_1$ |
| 2 | $PD_2$ |
| : | : |
| : | : |
| N | $PD_{NTOT}$ |

| CID_J | |
|---|---|
| 1 | $Frame_1$ |
| 2 | $Frame_2$ |
| : | : |
| : | : |
| N | $Frame_N$ |

186

METHODS AND SYSTEMS FOR SCHEDULING OFDM FRAMES

CROSS REFERENCE TO RELATED APPLICATIONS

This application is a continuation of U.S. application Ser. No. 14/293,693, filed Jun. 2, 2014, entitled "METHODS AND SYSTEMS FOR SCHEDULING OFDM FRAMES", which is a continuation of U.S. application Ser. No. 11/540,571, filed Oct. 2, 2006, entitled "METHODS AND SYSTEMS FOR SCHEDULING OFDM FRAMES", which claims the benefit of prior U.S. Provisional Application No. 60/799,314, filed May 10, 2006, entitled "METHODS FOR QOS SCHEDULING OF FRAMES WITH MULTIPLE BURSTS AND MULTIPLE MODULATIONS", which are incorporated by reference herein in their entirety for all purposes.

FIELD

The invention relates to methods and systems for scheduling OFDM frames.

BACKGROUND

Many schedulers have been defined that are suitable for scheduling sequential transmission of resources on a single transmission medium that has common channel conditions. These schedulers are not, in general, applicable to OFDMA scheduling in which there is a two dimensional resource (time and frequency) for use in transmitting to multiple users that will experience different channel conditions at different times, and for different frequencies within the available frequency resource.

SUMMARY

According to one broad aspect, the invention provides a method of scheduling OFDM frames, each frame comprising at least one OFDM symbol, each OFDM symbol comprising a plurality of subcarriers, the method comprising: for each packet to be scheduled assigning the packet a plurality of scheduling metrics; producing at least one ordering of packets using the metrics; using the at least one ordering to select a set of packets to send in a current frame; for each OFDM frame, constructing the OFDM frame from packets assigned to the frame by placing each packet in a respective rectangular time-frequency burst within the OFDM frame, at least some of the OFDM frames including packets for multiple users; transmitting the OFDM frames using at least one transmit antenna.

In some embodiments, the at least one ordering comprises: at least one compulsory ordering that is always performed; at least one ordering that is performed only some of the time.

In some embodiments, the method further comprises: performing at least one partial ordering of the packets that treats groups of packets equally in the partial ordering.

In some embodiments, the method further comprises: determining groups of packets that are more optimal than others for transmission in a single frame, and taking into account such groups in making scheduling decisions.

In some embodiments, the method further comprises: temporarily assigning each packet to a particular frame using a deadline for departure for the packet.

In some embodiments, the method further comprises: where all packets assigned to a frame to be transmitted fit in the frame, selecting at least one packet from a later frame bucket using one or more of the orderings.

In some embodiments, the metrics include at least one metric selected from a group comprising: earliest time of departure, deadline for departure, user/operator priority, link condition, power save mode considerations, frame fitting information.

In some embodiments, the geometrical restriction comprises a list of possible rectangular resource sizes that can be used to transmit the packet.

In some embodiments, the method further comprises updating the geographical restriction if there is a change in robustness of data transmission to be used for the packet.

In some embodiments, the indexes comprise at least one: head of line ordering that defines an ordering of a most recent packet for each CID; frame bucket wide ordering that defines an ordering of all packets temporarily assigned to a given frame; all packets wide ordering that defines an ordering of all packets.

In some embodiments, the method further comprises: for at least some future frames, allocating resources for the retransmission of packets that may require multiple transmissions.

In some embodiments, the amount of resources allocated for future transmissions is a function of a statistical likelihood of retransmission being required.

In some embodiments, the method further comprises: for a frame to be transmitted, performing multiple passes to find improved frame packing of bursts in the frame; stopping performing the passes at a time that ensures the best frame as of that time can be constructed and transmitted on time.

In some embodiments, the method further comprises allocating at least some bursts for simultaneous transmission using MIMO.

In some embodiments, allocating at least some bursts for simultaneous transmission using MIMO is performed for UL collaborative MIMO.

In some embodiments, allocating at least some bursts for simultaneous transmission using MIMO comprises: determining sets of bursts that are appropriate for simultaneous transmission using MIMO.

In some embodiments, determining sets of bursts that are appropriate for simultaneous transmission using MIMO comprises: determining sets of wireless stations with sufficient orthogonality of channel conditions for MIMO and, for such determined sets of wireless stations, determining a number of symbols that can be saved by using MIMO as opposed to not using MIMO for sets of bursts.

In some embodiments, the method further comprises: selecting the sets that maximize the savings for UL collaborative MIMO.

In some embodiments, the method further comprises: altering modulation and error coding to be more robust if there is room in the frame; altering modulation and error coding to be less robust if there is less room in the frame.

In some embodiments, the method further comprises: receiving packets for transmission; performing the scheduling for the packets received for transmission.

In some embodiments, the method further comprises: receiving requests for uplink transmission resources; performing scheduling for the requests for uplink transmission resources.

According to another broad aspect, the invention provides an OFDM transmitter for transmitting OFDM frames, each frame comprising at least one OFDM symbol, each OFDM symbol comprising a plurality of subcarriers, the scheduler comprising: at least one transmit antenna; a classifier and marker that assigns each packet to be scheduled a plurality of metrics; a multi-parameter frame optimizer adapted to: a) produce at least one ordering of packets using the metrics; b) use the at least one ordering to select a set of packets to send in a current frame over the at least one transmit antenna, at least some frames containing packets of multiple users.

In some embodiments, a base station comprises: the OFDM transmitter as summarized above.

In some embodiments, said at least one transmit antenna comprises at least two transmit antennas.

BRIEF DESCRIPTION OF THE DRAWINGS

Embodiments of the invention will now be described with reference to the attached drawings in which:

FIGS. 4A through 4E are data structure diagrams for various data structures used to perform traffic classification and sorting;

DETAILED DESCRIPTION

Figure 1:
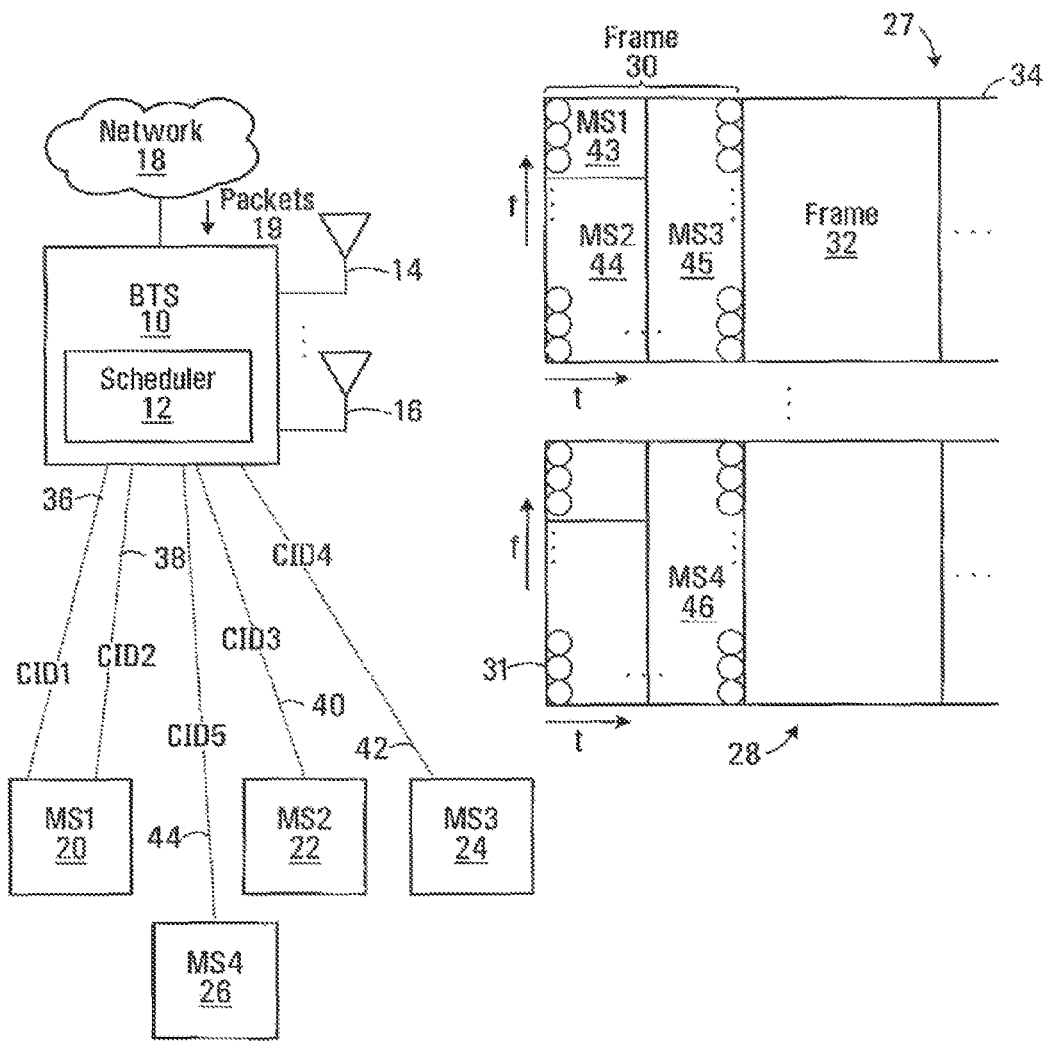
FIG. 1 is a block diagram of an OFDM communications system.

FIG. 1 is a simplified block diagram of an example of an OFDM communications system. In some embodiments, this might be compliant with one or more iterations of one IEEE 802.16 e, the mobile wireless broadband standard established by the IEEE and utilized by the WiMAX™ Forum. Shown is a base station 10 having a scheduler 12. The base station has a set of antennas 14,16. In the illustrated example, two antennas are shown; more generally, for SISO applications, there is one antenna, and for MIMO applications, there is more than one antenna. The BTS 10 is shown connected to a network 18. The network 18 can be considered to include any network from which/over which packets 19 are delivered to/from the BTS 10. Also shown is a plurality of mobile stations MS1 20, MS2 22, MS3 24, MS4 26. Given that these stations are mobile, the set of mobile stations that will be in the coverage area of BTS 10 will change over time and will vary in number. Alternatively, nomadic or fixed wireless devices may be used. Each mobile station 20,22,24,26 communicates with the BTS 10 in respect of at least one logical connection identified by a CID (connection identifier). In a particular instance illustrated, MS1 20 is shown having logical connections with CID1 36, CID2 38. MS2 22 is shown with logical connection having CID3 40. MS3 24 is shown with logical connection 42 having CID4. Finally, MS4 26 is shown with logical connection 144 having CID5. More generally, any appropriate number of logical connections for each of the mobile stations within the coverage area of the BTS 10 may be established. Multi-access OFDM systems such as shown in FIG. 1 are also referred to as OFDMA systems. In such systems, frames are transmitted that include content for multiple receivers.

The BTS 10 transmits using an OFDM transmission format. With OFDM, there is a set of OFDM sub-carriers that are closely spaced in frequency. A single OFDM symbol includes the contents of all of these OFDM sub-carriers over a symbol transmission duration. The format of an OFDM signal transmitted by the first antenna 14 is generally indicated by 27. This is shown to consist of a sequence of frames 30,32,34 where frequency is shown in the vertical direction and time is shown in the horizontal direction. Each small circle in frame 30 represents what is transmitted on a single sub-carrier for a single symbol duration. Each frame includes k OFDM symbols, where k≥2. A similar OFDM format is shown for the second antenna 16 generally indicated at 28 with the first frame indicated at 31. More generally, a similar format is employed for each antenna of the BTS 10. The OFDM frames represent the two-dimensional resource that can be allocated for transmission to mobile stations (downlink transmission). A similar frame format may be used to uplink transmission. In that case, each mobile station is allocated a burst, and multiple mobile stations transmit their bursts so as to fill up the frame. In some embodiments, detailed below, there is overlap between the bursts transmitted by two or more mobile stations in certain circumstances, this being referred to as collaborative MIMO. It is assumed that any transmission for a given mobile station is to be allocated a rectangular portion of a frame, hereinafter referred to as a burst. In other words, the contents for a given mobile station will be within a frame, and will be contained within an N by M resource where N is a number of sub-carriers and M is a number of OFDM symbol durations. Example allocations during the first frame 30,31 transmitted by two antennas 14,16 shows allocations 43,44,45,46 for MS1 20, MS2 22, MS3 24 and MS4 26 respectively.

Classification and Marking

Figure 2:
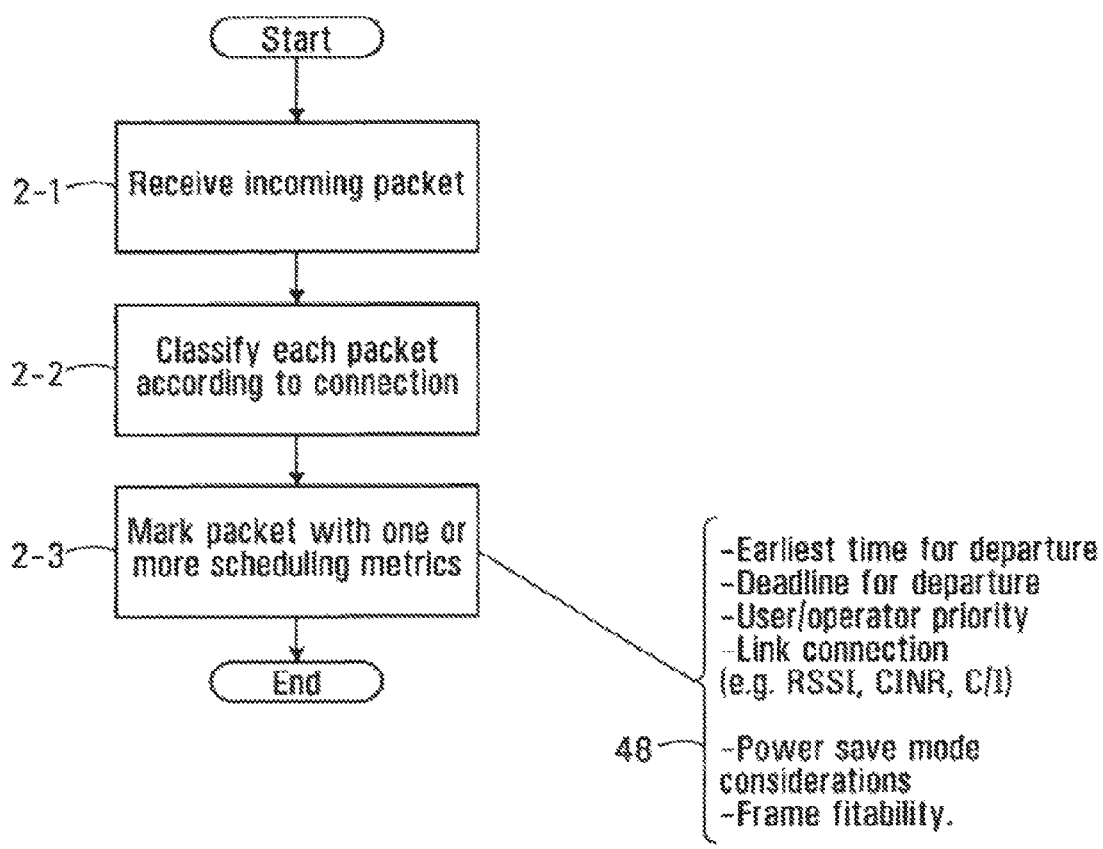
FIG. 2 is a flowchart of a method of classifying and marking packets in accordance with an embodiment of the invention.

FIG. 2 is a flowchart of a method of packet classification and marking that is executed for each packet 19 that is received by the BTS 10. An incoming packet is received at step 2-1. The packet is classified according to connection at step 2-2. This might for example involve examining a CID (connection identifier) within a packet. The CID can be used as an index to a table that acts as a virtual repository of information pertaining to a connection and all packets associated to it. It can be used as key to the information that the BTS has for all connections. For instance it might contain QoS (quality of service) parameters such as maximum and minimum committed rates and/or channel quality measurements such as CINR (carrier to interference and noise ratio) the receiver reports about the state of the physical conditions in the radio path to the mobile station. Each packet is marked with one or more scheduling metrics in step 2-3. Note that the scheduling metrics that can be applied for different connections can be different. Various examples of scheduling metrics are shown generally indicated at 48 and include: earliest time of departure, this indicating the earliest frame that a packet may be sent to meet certain QoS or functional requirement; deadline for departure, this indicating a latest frame by which the packet needs to be transmitted to meet QoS requirements; user/operator priorities, this representing a priority that can be used to rank certain users above certain other users and/or certain operators above certain other operators; link condition—this can be used to store one or more parameters that represent the link over which that particular packet will be transmitted, particular examples including RSSI (received signals strength indication), CINR, and C/I (carrier to interference ratio); power save mode considerations—this can be used to store parameters that represent whether a particular packet is being transmitted to a mobile station that has power save mode; frame fitting metric—this is a parameter that captures geometrical restrictions the frame may impose on how the packets are packed in. Details of many of these metrics are provided below.

Frame fitting is a term to describe how suitable a packet is to be put in a frame when considering its dimensions, assuming each packet is to occupy a rectangular resource. In some embodiments, a packet is tagged with a set of possible rectangular resource sites that can be used to transmit the packet, and these tags constitute frame fitting metric.

For example, in a 2-dimensional resource a packet of size 32 can be placed as 2×16 rectangle or a 4×8 rectangle. A packet that needs 32 symbols is tagged at this time with its possible dimensions ((2,16), (4,8)). At some later point the number of symbols may be changed (e.g. when the radio conditions worsen a decision may be made to use more symbols to send the same amount of data for more robustness or if two packets are to be combined and sent together in a burst) the set of possible dimensions is updated as well. The use of the frame fitting metric in packing a frame is detailed below.

In some embodiments scheduling using the methods described herein is only performed in the downlink direction. The actual packets to be scheduled are available in this case. In some embodiments, scheduling using the methods described herein is performed in the uplink direction, and in further embodiments scheduling using the methods described herein is performed in both the uplink and downlink directions.

For embodiments in which uplink scheduling is to be performed, the scheduler deals with grant-requests which are sent to the scheduler requesting space in the UL frame to send a packet in the UL direction. The scheduler can process the grant requests much like they are actual packets, by using its CID to retrieve the connection parameters and calculating the appropriate metrics.

In some embodiments, scheduling the transmission of signalling information for the uplink and/or downlink is treated in the same way. In case of signalling however a real connection ID may not available or applicable. In some embodiments, non-data, signalling specific keys are used in the same fashion as the CIDs used for data connections. Furthermore, some traffic metrics that are applicable to data traffic may not be available for signalling. As such special parameters for signalling such as earliest frame to send, and last frame to send may be substituted. Other parameters like position in the frame and priority relative to other signalling and data are examples that may be specific to signalling.

Various implementations may perform the scheduling using the methods described for any combination of one or more of downlink packets, uplink grant requests, signalling for UL, signalling for DL. References to "packets" in the following refer generally to whatever set of resources are to be scheduled in this manner.

Figure 3:
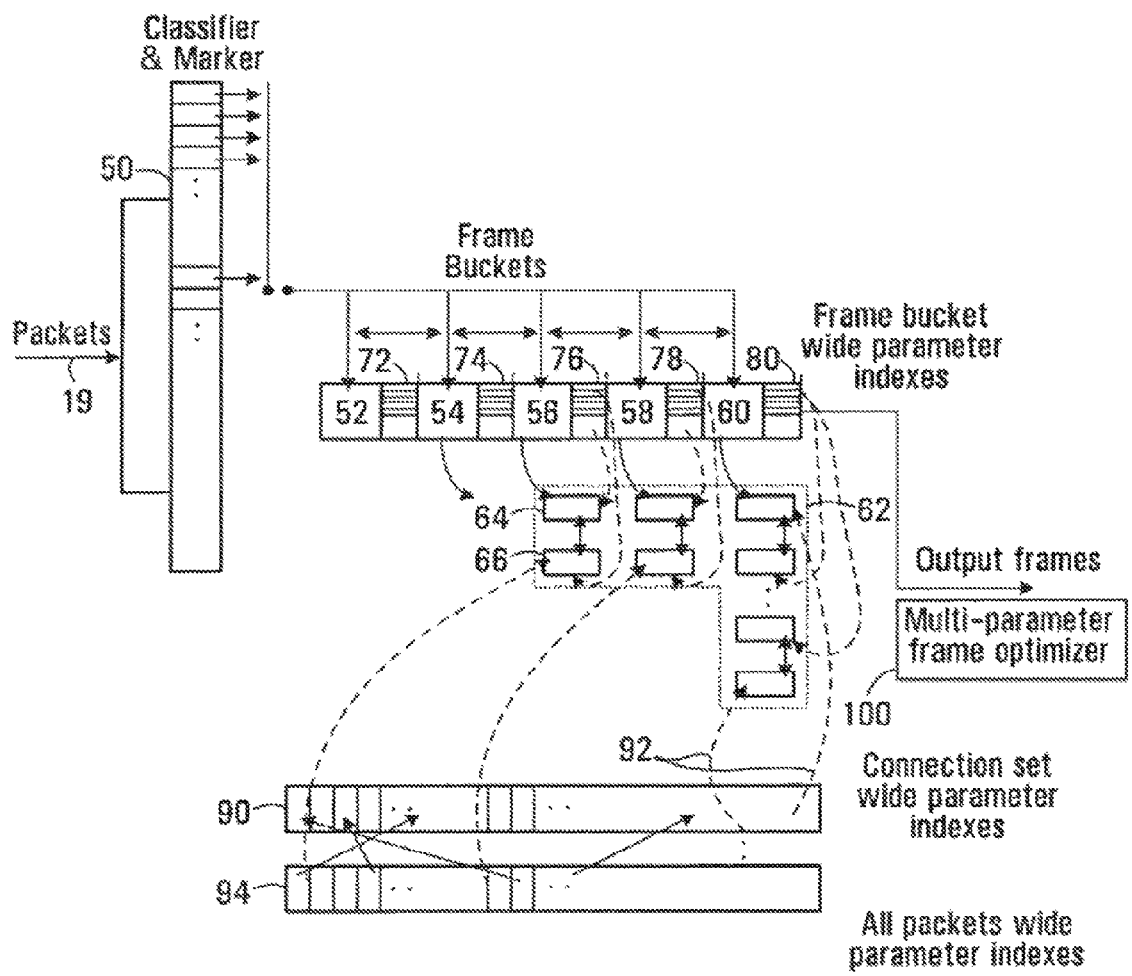
FIG. 3 is a schematic diagram of a scheduler provided by an embodiment of the invention.

Referring now to FIG. 3, shown is a schematic diagram of an example implementation of the scheduler 12. The scheduler can be implemented in hardware, software in which case it is deliverable as computer readable medium, or a combination of hardware and software, such a combination including at least one circuit such as a microprocessor, DSP, ASIC, FPGA to name a few examples. Incoming packets 19 are classified and marked with one or more scheduling metrics by classifier and marker 50. After classification and marking, the packets are assigned to one of a plurality of frame buckets. Each frame bucket represents a future frame to be scheduled and transmitted. Assigning a packet to a frame bucket amounts to a temporary assignment of the packet to be transmitted in that frame when the time arrives. In the illustrated example there are five frame buckets 52,54,56,58,60. The number of frame buckets can be arbitrarily selected subject to the limitation that most packets will have a deadline for departure and as such cannot be scheduled further in the future than this deadline. Note that assignment to a frame bucket can be logically performed or physically performed. For example, the packet can be physically moved into a memory location associated with a frame bucket. In another example, the packet can be stored in an arbitrary location, with pointers to the packets stored in the frame buckets.

Figure 4A:
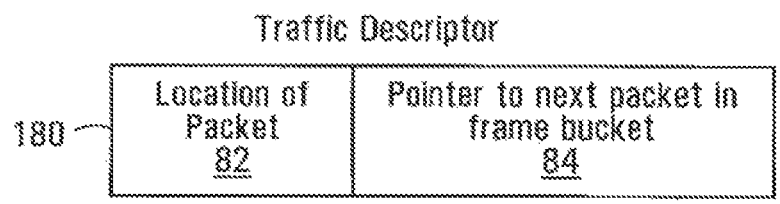

In some embodiments, each incoming packet has a packet descriptor, this being a data structure that can travel with the packet or be stored separately. The packet descriptor contains information identifying the physical location of the packet and other parameters associated with the packet such as the scheduling metrics. In a particular example, the frame buckets are implemented by using a linked list of pointers between these packet descriptors. An example of such a packet descriptor is indicated at 180 in FIG. 4A. This particular packet descriptor has a field 82 for the location of the packet and a field 84 to point to the next packet in the same frame bucket. This is also illustrated in FIG. 3 where packet descriptors are shown generally at 62. For frame bucket 56, there is a pointer to a first packet descriptor 64 which in turn points to a second packet descriptor 66. In a similar manner, the packet descriptors for each frame bucket can be identified. The packet descriptor can also include the various metrics determined during packet classification and marking.

In some embodiments, the packets that are assigned to a given frame bucket are not ordered, but rather are all considered equal.

Having determined a frame bucket for each packet and one or more metrics, packets are now ordered according to their rank on these metrics. Various types of ordering can be performed, and examples of each of these will be given below. Some orderings are performed across all packets that have been received and are awaiting transmission, also referred to as "all packets wide". Some orderings take place only for the oldest packets for each CID (also referred to as "head of line"). Some orderings take place on the basis of all packets temporarily assigned to a given frame, also referred to as "frame bucket wide".

Referring now to FIG. 3 again, frame bucket wide parameter indexes that might be used to establish frame bucket wide ordering are shown at 72,74,76,78,80 for frame buckets 52,54,56,58,60 respectively. Each frame bucket wide parameter index has a form shown by way of example in FIG. 4B generally indicated at 182. This shows pointers $PD_1, PD_2, \ldots PD_K$ to all of the packet descriptors for the packets stored in each frame bucket where $PD_1$ points to the packet descriptor of the highest rank packet according to a particular criteria, and $PD_K$ points to the packet descriptor of the lowest rank packet according to that criteria. Note that there can be multiple different frame bucket wide parameter indexes. Frame bucket wide indexes are useful to find packets that may be promoted or demoted to an earlier or later frame respectively. For example, a radio condition index (which specifies the present condition of the link to a mobile station) may be used to promote packets that have better radio conditions now or demote the packets that have poor radio conditions now, the heuristic being that delaying a packet with poor conditions may allow it to be sent later when the conditions improve. The same heuristic can be applied to the case when promoting a packet with good current radio conditions. Note that if the radio conditions vary randomly then sending according to the radio conditions at their peaks will increase aggregate throughput of the system. Other possible frame bucket wide indexes could include fitting metrics like possible dimensions that were defined earlier.

Figure 4B:
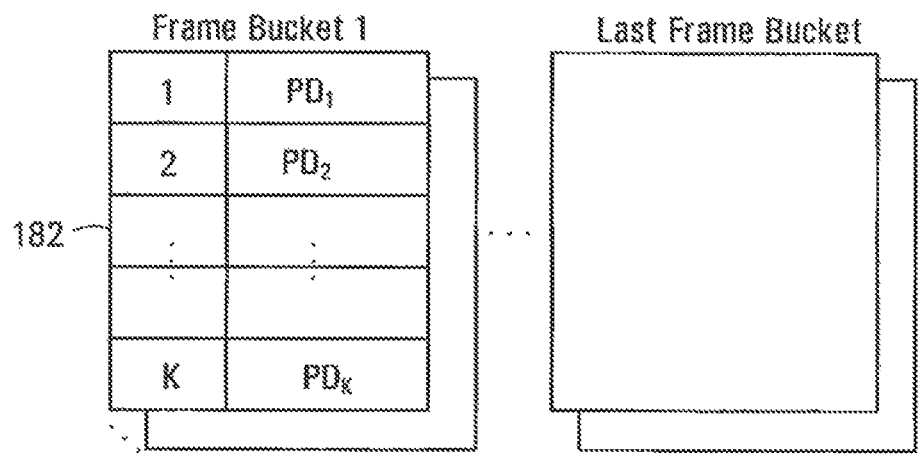

FIG. 4B is a very specific structure for implementing the frame bucket wide parameter index. In another example, the traffic descriptor of FIG. 4A can be supplemented with another field that allows for an ordering according to frame bucket wide parameter index.

With further reference to FIG. 3, an example of a connection set wide parameter index that might be used to establish connection set wide ordering is indicating generally at 90. A connection set wide parameter index allows for an ordering of the oldest packets associated with each connection identifier.

Figure 4C:
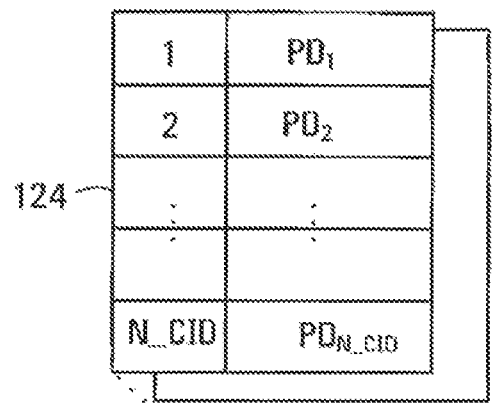

An example of such a connection set wide ordering is shown in FIG. 4C. This is the same format as the frame bucket wide parameter index of FIG. 4B, with a set of indexes I through $N_{N\_CID}$ (where $N_{N\_CID}$ this is the number of CIDs being indexed) and pointers $PD_1$ $PD_{N\_CID}$ to respective packet descriptors. There can be multiple such connection set wide orderings implemented. In FIG. 3, connection set wide parameter index 90 is shown with pointers 92 pointing to various packet descriptors according to their order as determined by a connection set wide parameter ranking.

Finally, an example of an all packets wide parameter index that might be used to establish an all packets wide ordering is indicated at 94. With such an index, all of the packets that have been received are indexed together. An example of the structure this might take is shown in FIG. 4D where the ordering of all the packets 1 through $N_{TOT}$ is shown with a pointer to a respective packet descriptor for each index. Once again, multiple such orderings can be implemented.

The above discussed fitting metric, in the form of one or more sets of dimensions, can be used to generate an index of dimensions, either for all packets, on a frame-wide basis, or head of line basis.

The frame bucket wide parameter indexes, connection set wide parameter indexes, and all packet wide parameter indexes are maintained on an ongoing basis. As packets are received, they are added to the appropriate indexes. Similarly, as packets are transmitted, they are removed from the appropriate indexes. Other mechanisms of generating and maintaining orderings are contemplated.

Partial Ordering

In some embodiments, in addition to the above indexing, the scheduler also performs partial ordering of packets, again based on one or more of the metrics. By partial ordering, it is meant that groups of packets are treated as equal as opposed to ranking the packets where indexes are used. An example of this is the ordering that is done when packets are put into respective frame buckets. The deadline time for a given packet specifies which frame a packet is to go out on (in other words which bucket). Many packets can be in the same frame and are therefore equal in this partial ordering scheme. Thus, as mentioned above, all packets assigned to a given frame bucket are considered equal in this partial ordering. The processing cost to perform partial ordering compared to maintaining an ordered queue for all packets is much less. A partial ordering can be maintained in a similar manner to the above discussed indexes, the only difference being that the order of the packets is not given any significance.

Grouping of Packets

Instead of or in addition to trading off one packet against another using the above indexing approaches, in some embodiments groups of packets are traded off against each other. In particular, some groupings of packets can be determined to be more optimal than others. For example, a particular set of packets being packed together in a single frame may be more efficient in terms of transmit resource utilization than another set of packets. The following are three different examples of such packet groupings that can be generated:

a) Packets that fit perfectly (or more perfectly) in a burst within a frame, are more efficient than such a packet that leave holes. For example a packet of 100 bytes when modulated may need 20 symbols (depending upon the modulation chosen). These 20 symbols are allocated into a frame. The region that these 20 symbols occupy is called the burst that corresponds to the original packet. The scheduler creates bursts for all packets in the frame and tags them appropriately. The modem takes the bits in the packets and modulates them to fit them in the burst inside the frame.

b) Bursts destined for a set of mobile stations that have higher orthogonality in terms of radio conditions are better for simultaneous transmission on multiple antennas. For example, in a MIMO BTS having two antennas, if a BLAST transmission format is employed, then the best performance is realized if the two antennas are used to transmit to mobile stations that are physically spaced as far apart as possible;

c) Sets of bursts that satisfy certain modulation conditions may allow for better power spread over the frame; in one embodiment, all packets having the same modulation type are grouped together in a common frame; in other embodiments, a range of different modulation types within each frame can result in better performance. The particular combination of modulation type or types that will produce the best performance is an implementation specific detail.

The scheduler's primary function is to find "suitable packets" under various conditions. At any time the suitability of the packet depends upon various factors that are represented by its metrics. For example a packet P that may be more suitable to be sent in the next frame than another packet Q because it is higher on an increasing index of deadlines may not be suitable because of its dimensions (indicated by the dimension index). In this case the scheduler may decide to search the index of dimensions to find packets that fit the available space and then pick the packet with the earliest deadline among them. Depending upon the conditions and the configuration provided to the scheduler, the scheduler will use various partial orderings and indexes to pick packets. For example, given indexes {I_1, I_2, . . . } and Partial Orderings {P_1, P_2, . . . }, the scheduler may start with P_1 to pick the first set of packets and then remove packets which are above a certain value in the index I_1, then pick all packets in P_3 and so on. Which partial ordering or index to pick will depend upon the trade-off or optimization the scheduler is trying to make at a particular point.

In some embodiments, there is an ordering of the indexes themselves that may change from time to time, that the scheduler uses.

As a concrete example the scheduler can start filling a frame with a partial ordering of frame deadline (i.e. first pick all packets that need to go out on this frame). If it is able to fit all the packets that have to be sent it can use index of best radio conditions to fill more of the frame, assuming it is trying to maximize the achieved throughput. This approach will make sense when there may be a possibility of congestion that might be alleviated by higher throughput. However if there is not much traffic the scheduler may choose to use deadline ordering again to make sure that packets experience the least amount of delay. If it is unable to fit all packets in a deadline grouping in a particular frame it can decide to use the index of radio conditions to remove the packets that have poor conditions and send them in a later frame.

Figure 5:
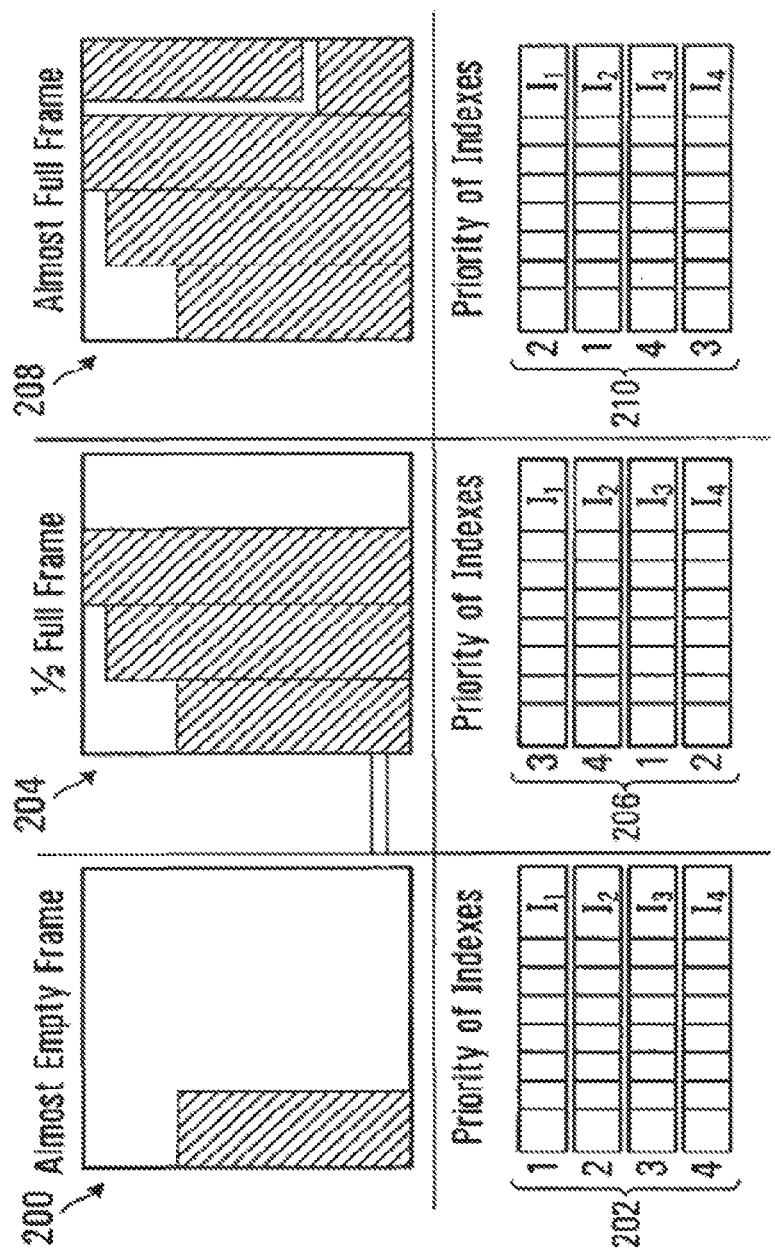
FIG. 5 is a schematic diagram showing reprioritization of indexes as a frame fills up.

An example of this is depicted graphically in FIG. 5. Here it is assumed that scheduling is to be performed using four indexes $I_1$, $I_2$, $I_3$, $I_4$. While the frame is empty or almost empty for example as depicted at 200, the priority of the indexes is $I_1$, $I_2$, $I_3$, $I_4$ as indicated at 202. When the frame becomes about ½ full for example as depicted at 204, the prioritization changes to $I_3$, $I_4$, $I_1$, $I_2$ as indicated at 206. Finally, when the frame is almost full as depicted at 208, the prioritization changes to $I_2$, $I_1$, $I_4$, $I_3$ as indicated at 210. Thus, as the scheduler fills up the frames, it changes the priority of the indexes (and/or partial orderings). For the particular example illustrated, the same set of indexes are used each time the prioritization changes. In other implementations, one or more new indexes are added to the prioritization and/or one or more existing indexes are removed from the prioritization.

Once it is time to transmit a frame, if the current frame cannot accommodate all of the packets that have been assigned to that frame bucket, then some of the packets will be moved to a subsequent frame. The selection of which packet or packets to move into a subsequent frame may be made on the basis of ordering a packet inside the frame as described previously. Conversely, if the frame has room to accommodate additional packets, then the ordering of packets in the next frame can be used to pick one or more appropriate packets to move forward into the current frame. More generally, multiple metrics may be defined, some of which may be frame specific, some of which may span several frames, some of which may be based on head of line packets (connection set wide) some of which may span all packets. Any of the metrics can then be used in order to decide which frames to move into a subsequent frame or into a previous frame.

Use of Frame Fittability when Packing a Frame

When packing a frame, it can be seen quickly if a packet will fit by comparing a free space in the frame of two dimensional size (x,y) by finding at least one possible set of dimensions marking for the packet (a_i, b_i) such that EITHER (a_i≤x AND b_i≤y) OR (a_i≤y AND b_i≤x).

In addition the best fitting of a given packet for a given free space can be found by matching a free space in the frame with a packet such that has the differences x−a_i and y−b_i (for the case that a_i<x AND b_i<y) are the smallest. This helps in choosing the packets to fill a given frame. For instance when a packet is to be selected from a set of packets to fill up a hole in the frame that is about to be sent out, the possible dimensions of the available packets are checked, which may be sorted for faster comparison, to find the most suitable one. The sorting or hashing of the metrics helps because the scheduler can focus on only the most applicable packets.

Note that it is more efficient to use less complex indexing systems wherever possible. An index is less complex when it is performed over a smaller number of packets. The decreasing order of complexity of the indexing systems discussed thus far is:

1) all packets
2) inter head of line packets; and
3) inter frame packets (frame bucket wide indexes).

The ordering and grouping of packets/bursts in some embodiments are created as each packet is received. Alternatively one or more of these functions can be performed during the time of framing. Alternatively one or more of these can be performed at any time, for example in a manner that exploits processor idle time.

Returning again to FIG. 2, the multi-parameter frame optimizer 100 uses the indexes, groupings and ranking of the indexes themselves in determining which packets to include in which frames. This may for example involve the use of various objective functions. Objective functions can be linear or more complicated. The scheduler can have a set of objective functions wherein a different objective function can be applied for each different operating condition.

In some embodiments, a linear optimization algorithm is used to produce a frame. With a linear optimization, the metric assigned to a given combination of packets for a given frame is determined by adding up linear combinations of the various parameters such as index, grouping, etc. For example, this could start with sets having the best fits, followed by an optimization on the best link condition and so on.

Linear optimization is where given several metrics X, Y and Z (more generally any number of metrics) some function F(X,Y,Z) over the metrics is minimized or maximized. In some implementations, the optimization may be further subject to one or more condition. An example of a specific condition is: aX+bY=Z. In some embodiments, the indexes of various metrics can be viewed as providing values for the metrics rather than using the metrics themselves. For example, an index of deadlines can be used to provide values for the deadline metric (say $d_i$) for the purpose of linear optimization, while the index of link condition can be used to provide values for link condition metric (say for the purpose of linear optimization and finally the priority index can be used to provide the priority metric (say $p_i$) for the purpose of linear optimization. The scheduler may try to maximize a linear function of all the metrics, weighted with appropriate co-efficients. The following is an example of such a linear function:

$$R = a \times d_i + b \times l_i + c \times p_i$$

The scheduler can then pick packets such that the value of R is maximized. In some embodiments, constants such as the constants a, b and c in the above equation are determined using boundary conditions that will commonly also involve system wide conditions such as system load (SL) and system fairness (SF) as well as the packet metrics. For example, the condition could be imposed that R must be greater than one (R>1) when SF>0.3 SL>0.5 and D<0, L>10 and P>1, where D L and P are the maximum numerical values for $d_i$, $l_i$, $p_i$ respectively. Such linear optimizations along with the metrics and the set of conditions are programmed into the scheduler.

As a practical example, the following objective function, where the $d_i$ and $l_i$ are as defined before and $v_i$ is the unfairness index value of a packet and $B_{max}$ is the maximum packet size and V is the maximum unfairness, performs well with respect to maximizing system throughput while at the same time providing fairness:

$$r_i = \begin{cases} l_i + k_1 d_i & \text{when } d_i < 0 \text{ where } k_1 \geq B_{max} \\ l_i + k_2 d_i & \text{when } d_i \geq 0 \text{ where } k_2 \geq \frac{B_{max}}{V} \end{cases}$$

In another embodiment higher order optimizations can be used that simultaneously use multiple metrics and associated indexes. A higher order optimization uses polynomial functions like $R=a \times d_i^2$ $b \times l_i^3 + c \times p_i$. Also different objective functions (e.g., R1, R2, . . . ) may be used during different system conditions: e.g. use R1 when SF>0 but use R2 otherwise.

Depending upon the optimization implemented, some optimizations may be NP HARD (non-polynomial hard) meaning that their running time may not be predictable and has the potential to grow exponentially. In some embodiments, the multi-parameter frame optimizer will perform a multi-stage computation and store intermediate results. A time-out is defined that will terminate computation in time for the frame to be sent out on schedule. When the time-out occurs, the best intermediate result is then selected as the final result even though it is possible that it is not the most optimal result. In this manner, any excess processing power is used, but in the event the optimal solution is not found, the system still goes ahead and transmits something on schedule.

The following is an example of how a multipass frame fitter operates in accordance with some embodiments of the invention:

```
repeat until time to send the frame
{
    for p in all packets already in the frame
    {
        place p in a better position
        /*e.g. a better position would be a space that leaves more
        contiguous free space*/
    }
    CalculateTotalfreespace( )
    If total freespace can accommodate next packet
    {
        Place next packet and store position of packets in intermediate results
    }
}
```

Fairness Based on Modulation, ARQ, HARQ

In some embodiments, scheduling is performed in a manner that attempts to provide fairness having regards to the modulation type employed, and whether ARQ and/or HARQ is implemented for a particular CID. A packet when scheduled and transmitted is to be considered capacity that has been allocated to a particular CID in fair scheduling. However, some packets are transmitted in a manner that is riskier than others. For example, a packet that is transmitted with a higher modulation rate, or employing various error coding schemes can be accommodated using a smaller amount of space in the frame. However, in return for this there is a higher likelihood that the packet will need to be re-transmitted. In order to provide fairness, according to the QoS requirements for each CID a statistical prediction of the likelihood of re-transmission for each CID can be determined and used to reserve future frames that the present transmissions as well as error recovery transmissions (if needed) will go out on. For example, a packet that is transmitted using a high modulation rate and HARQ may statistically have a 25% chance of requiring re-transmission, and as such to meet the QoS requirement for that flow, space for a retransmission packet is saved with 25% probability. In addition if indeed a retransmission is required the retransmitted packet may be picked ahead of other packets that may be transmitted for the first time. If it is expected that several retransmissions will be required, the scheduler will calculate the departure times of the packet and a probable number of retransmissions to account for the possibility of the delay faced by retransmitted packets. For example if a packet that has a deadline of D is being transmitted such that it is expected to require 2 retransmissions then the scheduler will divide the time D into 3 parts where $d_1+d_2+d_3=D$ such that the first transmission is send after time t1, the next retransmission at and the last one at t2.

MIMO Support

As described at the outset, some embodiments employ multiple transmit antennas at the base station, and for such implementations, various MIMO modes can be supported. Various indexes and groupings can be employed to help in determining which packets should be sent in MIMO mode and what mode should be employed.

One example of a MIMO mode involves sending/receiving more than one data stream simultaneously on different antennas. MIMO modes can be specified on a per burst basis inside a frame. For the duration of the burst two antennas can transmit/receive different data streams.

In some embodiments, the scheduler uses one or more criteria to determine if such a MIMO mode is efficient. The following is a specific example of two such criteria:

1) the channels of the two data streams should be uncorrelated as much as possible; and 2) the space that the MIMO bursts occupy in the frame should be efficiently utilized.

From the second criteria, it is readily apparent that suitable candidates for such a MIMO mode include two packets that can substantially fit within an entire burst in a frame to be transmitted on each antenna. This is because transmitting a full burst on one antenna while transmitting a relatively empty burst on the other antenna is inefficient.

To meet the first criteria, link condition indexes and groupings that might for example include power, antenna signatures, beam forming vectors can be used to find channels that are sufficiently orthogonal. Packets going over such channels can then be picked by the scheduler to be transmitted simultaneously on the various antennas. Because their channels are uncorrelated the transmissions are likely to be less prone to errors than without this criteria. Finally both criteria can be represented in a single equation for the scheduler to use as a uniform measure of finding MIMO packets.

As an example, consider a base station system with two receive antennas which can receive two independent streams from two mobiles $u_i$ and $u_j$ with packets $p_i$ and $p_j$ waiting to be sent. Given the channel conditions of all the mobiles that are waiting to send, the base station scheduler will compute 4 metrics: MIMO mode modulation coding for the packets if they were to be sent together and the SISO mode modulations for the packets if they were sent by themselves in SISO mode. This can be numerically represented as number of bits per symbol follows:

$m_{ij}$=bits/symbol for packet $p_i$ when paired with packet $p_j$;
$m_{ji}$=bits/symbol for packet $p_j$ when paired with packet $p_i$;
$s_i$=bits/symbol for packet $p_i$ when transmitted in SISO mode;
$s_j$=bits/symbol for packet $p_j$ when transmitted in SISO mode.

In order to determine how suitable $p_i$ of $u_i$ and $p_j$ of $u_j$ are to be paired in MIMO mode the scheduler will calculate the difference in the total number of symbols that the packets will take to be sent as SISO and the number of symbols the packets will require if sent as a MIMO burst.

Symbols saved by MIMO=symbols required for MIMO transmission of $p_i+p_j$–symbols for SISO for $p_i$–symbols for SISO for $p_j$, and can be expressed as follows:

$$\frac{b_i}{s_i} + \frac{b_j}{s_j} - \left( \frac{b_i - b_j \frac{m_{ij}}{m_{ji}}}{s_i} + \frac{b_j}{m_{ji}} \right)$$

where $b_i$ and $b_j$ are the respective packet sizes for mobile $u_i$ and $u_j$.

Given a set of packets the scheduler will compute a table of the MIMO savings for all pairings and can then pick the most efficient pairings to create an efficient frame.

Sleep Mode

In some embodiments, some or all mobile stations have a sleep mode during which they cannot receive on all frames. Instead, the mobile station alternates between being "asleep" mode during which it is not listening, and being "awake" during which it is listening. For a given mobile station, it will only support the receipt of packets during times that it is awake and listening to the channel.

In some embodiments, the sleep mode can be supported by an additional index, referred to herein as the "sleep index" that indicates the frames into which a packet for a given CID can be put. FIG. 4E shows an example of a sleep mode index generally indicated at 188 for a given CID_J. Here, the index includes a set of pointers to the valid frames for a given CID. Once a given frame has been transmitted, a next valid frame can be added to the list so that there is always a set of valid frames for that CID. Having created such an index, the next frame (before or after the current frame that a packet is assigned to) that a packet may be moved to is determined by this sleep mode index. Anytime a packet is moved from one frame to another it must be done in a manner that is consistent with this index. For example, the last frame that a particular packet can be transmitted on and still satisfy its QoS may not be valid because it is during a period that mobile station is in sleep mode. The scheduler will then need to use the sleep mode index to pick an earlier frame that is not in the sleep interval.

Intra-Frame Prioritization

Intra-frame prioritization of packets for mobile stations in power saving mode is also used in some embodiments to help certain mobile stations conserve power. In some implementations, the system maintains information that allows it to determine which mobile stations would benefit from conserving power. For such mobile stations, bursts can be placed near the beginning of a given frame. Once a given mobile station receives its bursts within that frame, it can then go to sleep for the remainder of that frame and the following sleep interval. In an example scheduler implementation that takes sleep mode into consideration, the scheduler, after deciding on which packets will go in a frame, will check if a packet belongs to group of mobiles that require power saving. If so it will place them near the first time slot of the frame. Otherwise the packet can be placed later in the frame, for example at or near the last time slot of the frame.

In some embodiments, the sleep mode that is assigned to various mobile stations is done in a manner such that the active time intervals for the mobile stations is roughly evenly distributed. It would be inefficient to have all of the mobile stations sleeping at the same time. In another embodiment, an admission control of sleep enabled flows is performed on the basis of the capacity of frames that are indexed by the sleep index. More specifically, if multiple mobile stations are expecting to be serviced during particular frames due to their sleep mode, then this will need to be considered during admission control of such mobile stations.

Quality of Service

Instead of specifying the QoS in terms of bits/per second or other units that deal with bits, the basic unit of a frame, namely an OFDM symbol, may be used. This is advantageous because it maps directly to the frame, and it removes the uncertainty of channel condition and modulation. The scheduler can then schedule by distributing the symbols as committed.

Some applications may not be able to use this metric to specify QoS because they are usually interested in receiving a certain bandwidth in terms of bits per second. However, operators may prefer this metric because it maps to a direct cost to them in terms of transmission capacity. The symbols/second metric can be used for operator classes or operator specified user classes. The operators may set limits for the various user service classes based on this metric. For instance operators may deem that for a class of users (c1) the symbol per second should be no greater than a limit (l1) while the users that pay more (c2) have no limit. This would provide another level of control of the radio resources. For example, when mobile in class c1 has poor radio conditions it may receive less service limited by symbols/second to the limit l1, even though its bits/second may be high, while a mobile in class c2 will always receive the guaranteed bit/second no matter how poor its radio conditions are.

In the above examples, various metrics or attributes of incoming packets and their associated indexes and groupings have been described. Various metrics have been described that can be useful under various circumstances, while some of them such as deadline may be considered essential in some implementations in which case they are always needed for the scheduler to process a packet. Indeed it is possible to classify the metrics of a packet as compulsory or optional. Some metrics can be calculated once and the metric does not change while the packet is waiting to be sent. Such metrics can be referred to as static metrics. There may also be other metrics that change, possibly every frame. Such metrics can be referred to as dynamic metrics. Indexes and groups are created so that the scheduler can easily use the metrics that have been calculated. For instance the earliest departure time index can be implemented as an index of upcoming frames containing an entry for each upcoming frame ordered in increasing order of departure. Each frame entry in turn has a list of packets that become eligible after the previous frame in the list but before the said frame. Once the earliest time of departure is calculated for a packet, the frame it becomes eligible for can also be calculated. The entry for that particular frame is updated by adding to the list a descriptor of the packet. In similar fashion other metrics and their corresponding indexes are created and updated.

The following is a specific implementation of the scheduler in which two primary threads are employed. More generally, it is to be understood that many different scheduler designs can be produced that make use of the methods described herein.

Figure 6:
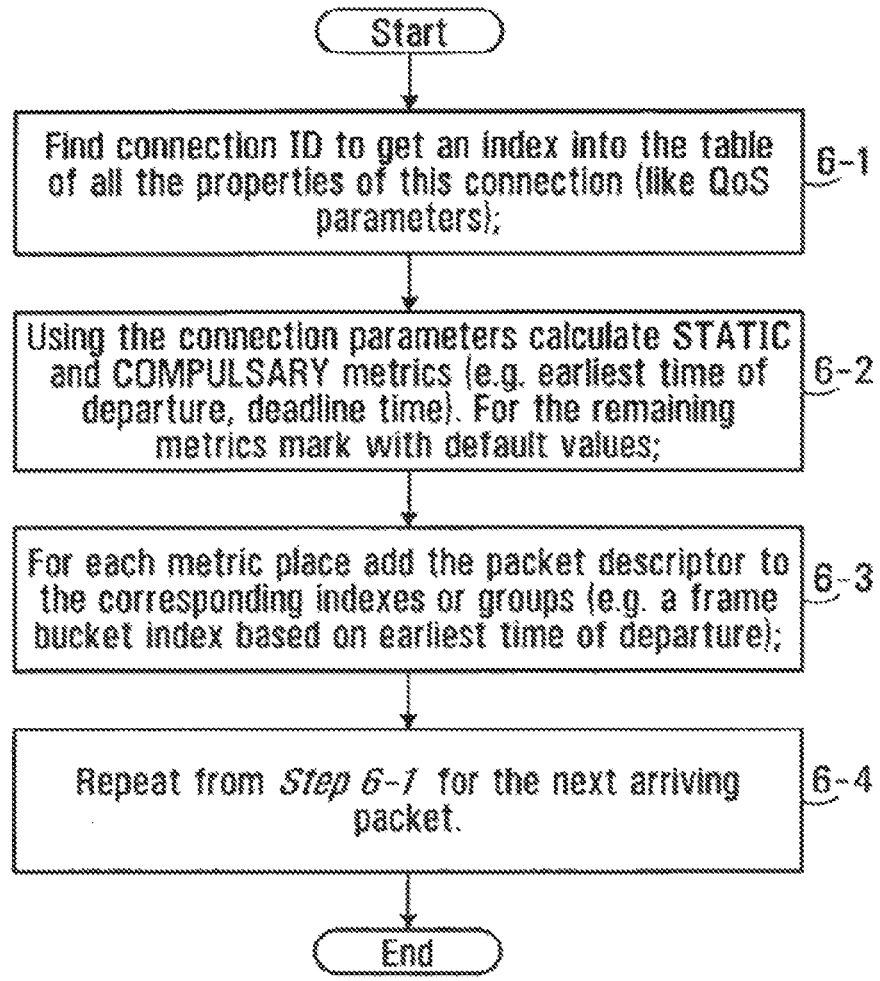
FIG. 6 is a flowchart of a method of processing packets prior to scheduling.

A first thread processes packets/grant requests and a second thread creates the frames. The packet processing thread, which may be implemented in a separate processor or micro-engine, works as follows, with reference to FIG. 6:

Step 6-1: Find connection ID to get an index into the table of all the properties of this connection (like QoS parameters);

Step 6-2: Using the connection parameters calculate STATIC and COMPULSARY metrics (e.g. earliest time of departure, deadline time). For the remaining metrics mark with default values;

Step 6-3: For each metric place add the packet descriptor to the corresponding indexes or groups (e.g. a frame bucket index based on earliest time of departure);

Step 6-4: Repeat from 1 for the next arriving packet.

Figure 7:
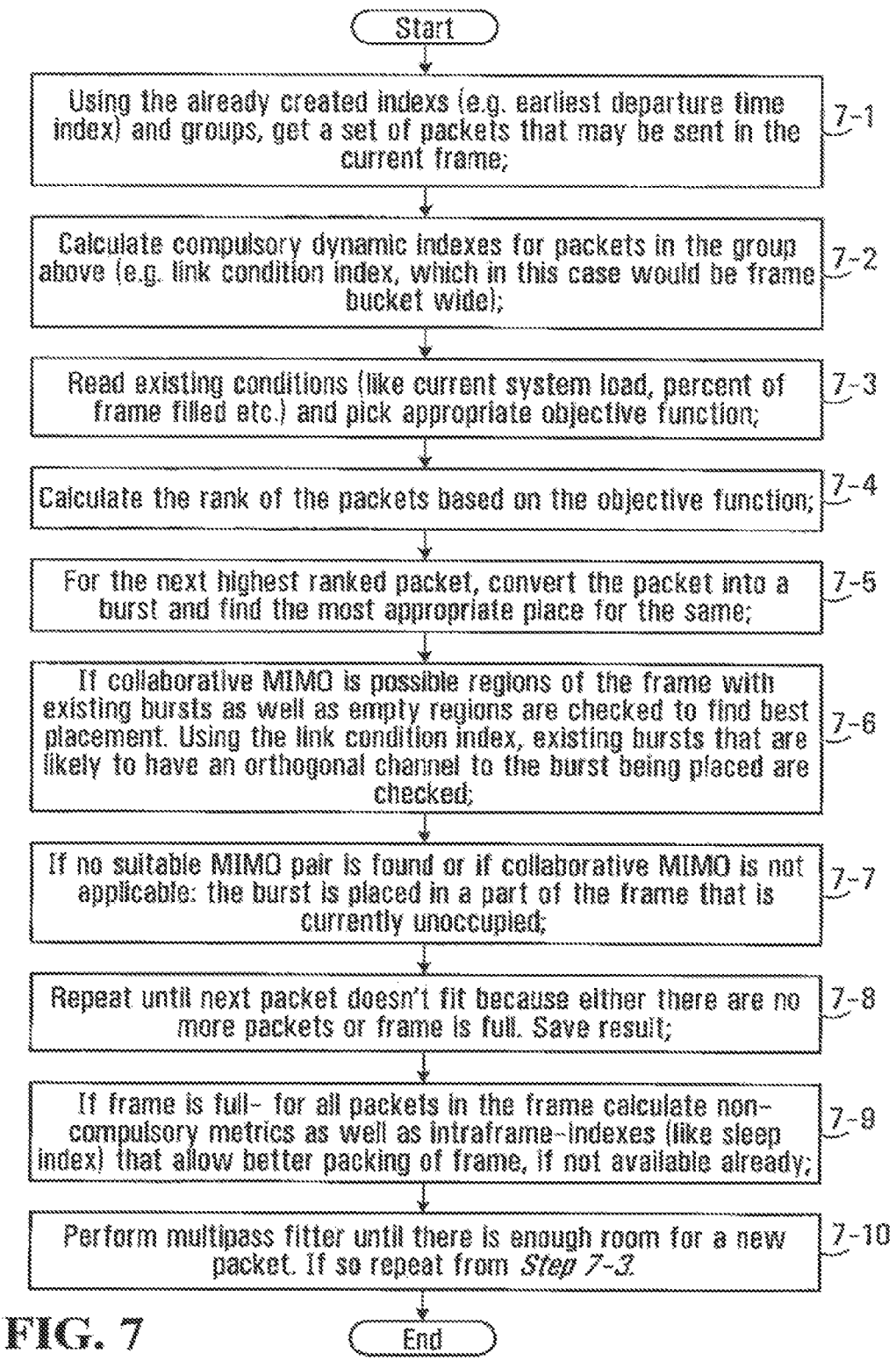
FIG. 7 is a flowchart of a method of scheduling packets processed using the method of FIG. 6.

The second thread creates frames, by operating as follows with reference to FIG. 7, until the time for handing over the frame to the lower level modules occurs. At such time the best saved frame is handed over.

Step 7-1: Using the already created indexes (e.g. earliest departure time index) and groups, get a set of packets that may be sent in the current frame;

Step 7-2: Calculate compulsory dynamic indexes for packets in the group above (e.g. link condition index, which in this case would be frame bucket wide);

Step 7-3: Read existing conditions (like current system load, percent of frame filled etc.) and pick appropriate objective function;

Step 7-4: Calculate the rank of the packets based on the objective function;

Step 7-5: For the next highest ranked packet, convert the packet into a burst and find the most appropriate place for the same;

Step 7-6: If collaborative MIMO is possible, regions of the frame with existing bursts as well as empty regions are checked to find best placement. Using the link condition index, existing bursts that are likely to have an orthogonal channel to the burst being placed are checked;

Step 7-7: If no suitable MIMO pair is found or if collaborative MIMO is not applicable: the burst is placed in a part of the frame that is currently unoccupied;

Step 7-8: Repeat until next packet doesn't fit because either there are no more packets or frame is full. Save result;

Step 7-9: If frame is full—for all packets in the frame calculate non-compulsory metrics as well as intraframe-indexes (like sleep index) that allow better packing of frame, if not available already;

Step 7-10: Perform multipass fitter until there is enough room for a new packet. If so repeat from step 7-3.

In some embodiments, secondary threads use free time on the processor to pre-compute the non-compulsory indexes.

In some embodiments, a multi-stage approach is employed to schedule packets, with stages being executed in sequence for each frame until an acceptable schedule is reached. Remaining stages need not be executed if an acceptable schedule is reached. For example, in a particular implementation the first stage involves mapping packets to frames on the basis of transmission deadline. Then, a subsequent sorting based on one or more indexes is performed only if necessary. More specifically, if the current frame is ready to be transmitted, and everything that needs to be transmitted fits into that frame in an efficient manner, then there is no reason to perform further sorting, and the frame can simply be transmitted. Only if there is a problem with the set of packets mapped to the current frame is further sorting performed. The compulsory indexes represent the first stage. The optional indexes and corresponding metrics are the second stage and sometimes may not be computed at all or sometimes will only be partially computed. As such, in some embodiments the optional index metrics are computed only when required.

In some embodiments, the modulation and error coding are selected as a function of how much room there is in a frame. For example, the modulation and error coding may be adjusted to be more robust if there is room in the frame, or the modulation and error coding may be adjusted to be less robust if there is less room in the frame.

Numerous modifications and variations of the present invention are possible in light of the above teachings. It is therefore to be understood that within the scope of the appended claims, the invention may be practiced otherwise than as specifically described herein.

What is claimed is:

1. A method for transmitting orthogonal frequency division multiplexing (OFDM) frames in a multi-access OFDM communication system, the method comprising:
by a base station of the multi-access OFDM communication system:
scheduling a set of packets in accordance with a plurality of scheduling metrics,
generating at least one ordering of packets to transmit in an OFDM frame; and
transmitting the OFDM frame using a plurality of transmit antennas,
wherein each OFDM frame is constructed from packets assigned to the OFDM frame, each packet being placed in a respective rectangular time-frequency burst within the OFDM frame, and wherein time-frequency bursts transmitted to a first set of mobile stations are grouped for simultaneous transmission using at least two of the plurality of transmit antennas,
wherein channel conditions for the first set of mobile stations have a higher orthogonality compared to channel conditions for a second set of mobile stations.

2. The method of claim 1, wherein the plurality of scheduling metrics includes at least one compulsory scheduling metric that remains static for multiple OFDM frames and at least one optional scheduling metric that dynamically changes for each OFDM frame.

3. The method of claim 1, wherein the set of packets are scheduled by temporarily assigning each packet to a particular OFDM frame using a deadline for departure for the corresponding packet.

4. The method of claim 1, wherein the plurality of scheduling metrics includes at least one scheduling metric selected from a group consisting of:
earliest time of departure, deadline for departure, user/operator priority, link condition, power save mode considerations, and frame fitting information.

5. The method of claim 4, wherein the frame fitting information is updated when there is a change in robustness of data transmission to be used for transmitting corresponding packets.

6. The method of claim 1, wherein the at least one ordering of packets comprises at least one of:
a head of line ordering that defines an ordering of a most recent packet for each connection identifier (CID);
a frame bucket wide ordering that defines an ordering of all packets temporarily assigned to a given OFDM frame; or
an all packets wide ordering that defines an ordering of all packets.

7. The method of claim 1, further comprising:
allocating resources of at least one future OFDM frame for retransmission of packets that require multiple transmissions.

8. The method of claim 1, further comprising:
performing multiple orderings of the packets to select the set of packets to send in the OFDM frame to improve a frame packing of time-frequency bursts in the OFDM frame.

9. The method of claim 8, further comprising:
stop performing the multiple orderings of the packets when the corresponding OFDM frame can be constructed based on a most improved frame packing of time-frequency bursts and transmitted on time.

10. The method of claim 1, further comprising:
allocating at least some time-frequency bursts to a third set of mobile stations for simultaneous transmission in an uplink (UL) direction using UL collaborative multiple-input multiple-output (MIMO) transmission.

11. The method of claim 10, wherein allocation of the at least some time-frequency bursts to the third set of mobile stations comprises at least:
determining sets of time-frequency bursts that are appropriate for simultaneous transmission using MIMO;
determining mobile stations that have sufficient orthogonality of channel conditions for MIMO to include in the third set of mobile stations; and
determining a number of symbols that can be saved by using MIMO as opposed to not using MIMO for sets of time-frequency bursts allocated to the third set of mobile stations.

12. The method of claim 1, further comprising:
altering robustness of modulation and encoding for the OFDM frame based on available room in the OFDM frame.

13. A base station comprising:
an OFDM transmitter for transmitting OFDM frames and comprising at least one transmit antenna; and
a scheduling device comprising:
  a classifier configured to classify packets in accordance with one or more scheduling metrics; and
  a scheduler configured to schedule a plurality of OFDM frames by assigning each packet to a corresponding OFDM frame using a logical assignment or a physical assignment, wherein packets are assigned to different OFDM frames based on one or more types of ordering of packets, and wherein each OFDM frame is constructed from packets assigned to the corresponding OFDM frame, each packet being placed in a respective rectangular time-frequency burst within the corresponding OFDM frame.

14. The base station of claim 13, wherein the physical assignment of a particular packet to the corresponding OFDM frame includes storing the particular packet in a memory location associated with the OFDM frame.

15. The base station of claim 13, wherein the logical assignment of a particular packet to the corresponding OFDM frame includes storing the particular packet in an arbitrary location and assigning a pointer to the particular packet stored in the OFDM frame.

16. A method for scheduling OFDM frames for an OFDM communication system, the method comprising:
classifying a set of packets in accordance with one or more scheduling metrics;
generating at least one ordering of packets to send in an OFDM frame using the one or more scheduling metrics; and
transmitting the OFDM frame using an OFDM transmitter comprising a plurality of transmit antennas,
wherein each OFDM frame is constructed from packets assigned to the OFDM frame by placing each packet in a respective rectangular time-frequency burst within the OFDM frame, wherein transmissions are grouped for simultaneous transmission to a first set of mobile stations that have a higher orthogonality of channel conditions than a second set of mobile stations.

17. The method of claim 16, wherein the one or more scheduling metrics used for classifying the set of packets comprise a connection identifier (CID) that includes one or more of: (i) a set of quality of service (QoS) parameters including a maximum committed rate and a minimum committed rate or (ii) a set of channel quality measurements including a carrier-to-interference-plus-noise ratio (CINR).

18. The method of claim 16, wherein a receiver of the OFDM communication system reports a state of physical conditions for radio paths between the OFDM communication system and mobile stations.

19. The method of claim 16, wherein the one or more scheduling metrics comprises one or more of: an earliest time of departure, a deadline for departure, user/operator priorities, radio path conditions, or power save modes.

20. The method of claim 16, wherein each packet of the set of packets are temporarily assigned to a particular OFDM frame using a deadline for departure for the corresponding packet.

* * * * *